Patented Feb. 14, 1950

2,497,806

UNITED STATES PATENT OFFICE 2,497,806

ELECTRODEPOSITION OF CADMIUM

Louis Weisberg, Stamford, Conn., assignor to The Lea Manufacturing Company, Waterbury, Conn., a corporation of Connecticut No Drawing. Application December 12, 1945, Serial No. 634,627

8 Claims. (Cl. 204—50)

This invention relates to electrodeposition of cadmium, and particularly to improvements in the method of plating, the composition of the plating bath and of addition agents for use in maintaining the efficiency thereof.

Electroplating with cadmium is well known, the metal being especially effective as a protective coating to prevent corrosion. Although the deposition of cadmium is effected readily, use of electro-deposited cadmium coatings has been retarded by the fact that such coatings are usually dull and unattractive. Attempts have been made heretofore to improve the appearance of cadmium coatings by adding so-called "brighteners" to the electrolytic bath. The previously suggested materials are not, however, entirely satisfactory, since they do not assure the deposition of a coating which is uniformly bright and free from stains. It has been necessary, therefore, to resort to expedients such as "bright dipping" after removal of the plated objects from the plating bath.

It is the object of the present invention to provide an improved method of electrodepositing cadmium whereby a clear and bright deposit of cadmium is formed on the object treated during the plating operation, no "bright dipping" or other treatment being required to afford a satisfactory product.

Another object of the invention is the provision of a novel plating bath, a composition for use in forming such a bath, and a composition adapted to restore the bath after use thereof.

Other objects and advantages of the invention will be apparent as it is better understood by reference to the following specification, in which the preferred embodiments of the invention are described.

My invention depends upon the discovery that coffee extract is an effective "brightener" in cadmium plating. The extract may be added as a freshly prepared solution, the ordinary "breakfast brew" being effective. From the standpoint of practical commercial operation, it is preferable to use a soluble concentrate, i. e., coffee extract in a dry pulverulent form. Any of the well known commercial concentrates may be employed with substantially equivalent results. Such concentrates are prepared by extracting roasted coffee with water, evaporating the resulting solution to produce a water-soluble solid concentrate, or by extracting unroasted coffee with water, evaporating the resulting solution to dryness, and then roasting the dry concentrate. In either case, the final product contains, in roasted form, substantially all of the non-volatile, water-soluble constituents of roasted coffee. The concentrates here mentioned do not contain added carbohydrate or other diluent, but consist only of evaporated coffee extract.

The amount of coffee extract required to insure a bright cadmium deposit is subject to considerable variation. The amount of coffee required decreases with increasing cadmium concentration. An amount equivalent to 1 gram of dry coffee concentrate per liter of plating solution has produced optimum results in a standard cadmium plating solution containing about 23 grams of cadmium per liter and operating under the usual conditions. Variations in the amount of coffee concentrate from 0.5 to 1.5 grams per liter are possible, because the amount of coffee in the plating bath is not critical. If an excess is added, it may be removed readily by adsorption on activated carbon. The operator can, therefore, readily adjust the bath to produce the best results by adding or removing small quantities of the coffee extract.

The amount of coffee required diminishes with increasing cadmium content approximately as shown in the following table:

| Cadmium Grams per liter | Coffee Concentrate Grams per liter |
|---|---|
| 23 | 0.5–1.5 |
| 26 | 0.3–0.6 |
| 30 | 0.2–0.5 |
| 34 | 0.2–0.4 |

When the cadmium content decreases to less than 20 grams per liter, the effectiveness of the brightener decreases sharply.

As in the general practice of bright plating with cadmium, preliminary purification is necessary to remove interfering impurities which are usually present in commercial cadmium salts. Treatment of the bath with zinc dust is a satisfactory purification procedure. Electrolyzing at low current density is also effective. The purification procedure is not critical, although it is necessary that certain impurities be eliminated.

The plating operation may be conducted with an insoluble anode at temperatures preferably between 20° and 35° C. (approximately 70° to 95° F.). The preferred plating bath is prepared by dissolving a cadmium compound such as cadmium oxide and an alkali metal cyanide such as sodium cyanide in water. It is frequently desirable to add an alkali metal carbonate or hydroxide, for example sodium carbonate. The resulting solution may contain "free cyanide" and double cyanides. It may contain also free alkali metal hydroxide, whether or not such material is added. The coffee extract may be introduced in the required proportion to ensure bright plating as hereinbefore described.

A typical plating bath may be prepared by dissolving in water:

| | Grams per liter |
|---|---|
| Cadmium oxide | 26 |
| Sodium cyanide | 109 |
| Sodium carbonate | 15 |
| Coffee extract concentrate | 1 |

It is often desirable to use a prepared composition which may be dissolved in water to produce a satisfactory plating bath. Such a composition may include in parts by weight:

| | Example 1 | Example 2 |
|---|---|---|
| Cadmium Oxide | 26 | 30 |
| Sodium Cyanide | 109 | 125 |
| Sodium Carbonate | 14 | 14.5 |
| Coffee Extract Concentrate | 1 | 0.5 |

The bath may be prepared by dissolving one or the other of these compositions in the proportion of 150 and 170 grams per liter of solution, respectively.

Often the user may prefer a composition in which some of the cyanide is omitted. Such a preparation may contain in parts by weight:

| | |
|---|---|
| Cadmium oxide | 26 |
| Sodium cyanide | 19 |
| Sodium carbonate | 14 |
| Coffee extract concentrate | 1 |

The correct bath is obtained by dissolving 60 grams per liter of the composition in water and adding 90 grams per liter of sodium cyanide.

Since the amount of coffee extract concentrate which is used is relatively small, it is convenient to have a composition which may be added to any cadmium plating bath. This, for example, may comprise in parts by weight:

| | |
|---|---|
| Coffee extract concentrate | 2 |
| Cadmium oxide | 5 |
| Sodium cyanide | 25 |

Such a composition may be added to the bath containing cadmium oxide and sodium cyanide in proportions to afford approximately 1 gram per liter of coffee extract concentrate in the finished bath.

An average current density of about 20 amperes per square foot is preferred under most conditions. For solutions with high metal content, this may be increased to 25 amperes per square foot.

It will be observed that the invention does not reside in the particular proportions of the ingredients of the bath such as the cadmium compound, the alkali metal cyanide and the alkali metal carbonate or hydroxide, if the latter are used. These ingredients in various proportions are commonly used in cadmium plating baths. The present invention comprehends the use of these known ingredients in any suitable proportions. In the appended claims, it is to be understood that the use or omission of alkali metal hydroxides or carbonates is included.

The present invention depends upon the discovery that coffee extract acts as a particularly effective "brightener" in the electrodeposition of cadmium. The invention includes the procedure employing coffee extract for this purpose and also compositions including this ingredient for use in preparing and maintaining cadmium plating baths.

Various changes may be made in the details of procedure and composition as hereinbefore described without departing from the invention or sacrificing the advantages thereof.

I claim:

1. A bath for plating bright cadmium consisting of an aqueous cadmium cyanide solution containing alkali metal cyanide and a roasted water extract of coffee containing substantially all of the non-volatile, water-soluble constituents of roasted coffee, said extract being in amount sufficient to impart a bright surface to cadmium deposited from the bath.

2. A bath for plating bright cadmium consisting of an aqueous solution of cadmium oxide, an alkali metal cyanide and a roasted water extract of coffee containing substantially all of the non-volatile, water-soluble constituents of roasted coffee, said extract being in amount sufficient to impart a bright surface to cadmium deposited from the bath.

3. A bath for plating bright cadmium consisting of an aqueous solution of cadmium oxide, an alkali metal cyanide and a roasted water extract of coffee containing all of the non-volatile, water-soluble constituents of roasted coffee, said extract being present in amount from 0.2 to 1.5 grams per liter and the proportion of cadmium oxide varying from 20 to 34 grams per liter of the bath.

4. A dry composition adapted for use in preparing and maintaining baths for plating bright cadmium consisting of cadmium oxide, an alkali metal cyanide and a roasted water extract of coffee containing all of the non-volatile, water-soluble constituents of roasted coffee.

5. A dry composition for the preparation of baths for plating bright cadmium containing, in parts by weight, cadmium oxide from 26 to 30 parts, sodium cyanide from 109 to 125 parts, sodium carbonate from 14 to 14.5 parts and a roasted water extract of coffee containing all of the non-volatile, water-soluble constituents of roasted coffee from 0.5 to 1 part.

6. In the art of plating bright cadmium, the process which comprises electrodepositing cadmium from a cadmium cyanide bath containing alkali metal cyanide and, as a brightening agent, a roasted water extract of coffee which contains all of the non-volatile, water-soluble constituents of roasted coffee in amount sufficient to impart a bright surface to cadmium deposited from the bath.

7. In the art of plating bright cadmium, the process which comprises electrodepositing cadmium from a cadmium cyanide bath containing alkali metal cyanide and, as a brightening agent, a roasted water extract of coffee which contains all of the non-volatile, water-soluble constituents of roasted coffee, said extract being present in the bath in the proportion of approximately from 0.2 to 1.5 grams of dry extract per liter of plating solution.

8. In the art of plating bright cadmium, the process which comprises electrodepositing cadmium from an aqueous solution containing, in parts by weight per liter, cadmium oxide from 26 to 30 parts, sodium cyanide from 109 to 125 parts, sodium carbonate from 14 to 14.5 parts, and from 0.5 to 1 part of a roasted water extract of coffee containing all of the non-volatile, water-soluble constituents of roasted coffee.

LOUIS WEISBERG.

(References on following page)

REFERENCES CITED

The following references are of record in the file of this patent:

UNITED STATES PATENTS

| Number | Name | Date |
|---|---|---|
| 1,692,240 | Young et al. | Nov. 20, 1928 |
| 1,891,383 | Giffen et al. | Dec. 20, 1932 |
| 1,932,769 | Copes et al. | Oct. 31, 1933 |
| 2,085,750 | Hendricks | July 6, 1937 |
| 2,223,973 | Teats | Dec. 3, 1940 |

OTHER REFERENCES

Transactions of the Electrochemical Society, vol. 63 (1933), pages 93, 94, and 96; vol. 67 (1935), pages 326, 327.

Hackh's Chemical Dictionary, 3d ed. (1944), page 211.

The Dispensatory of the United States of America, 23 ed. (1943), page 1331.

"Electrolysis of Zinc Sulphate Solutions at High Current Densities," a thesis by Graydon E. Holdeman, January 1936, at Purdue University, page 27.